United States Patent
Yamazaki

(10) Patent No.: US 11,327,388 B2
(45) Date of Patent: May 10, 2022

(54) ACCESSORY AND IMAGING APPARATUS INCLUDING THE SAME

(71) Applicant: CANON KABUSHIKI KAISHA, Tokyo (JP)

(72) Inventor: Toshinori Yamazaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/528,399

(22) Filed: Jul. 31, 2019

(65) Prior Publication Data
US 2020/0050088 A1    Feb. 13, 2020

(30) Foreign Application Priority Data

Aug. 10, 2018  (JP) .............................. JP2018-151367

(51) Int. Cl.
*G03B 17/56* (2006.01)

(52) U.S. Cl.
CPC ...... *G03B 17/565* (2013.01); *G03B 2217/002* (2013.01)

(58) Field of Classification Search
CPC ............................. G03B 17/565; G03B 17/002
See application file for complete search history.

(56) References Cited

U.S. PATENT DOCUMENTS

| | | | |
|---|---|---|---|
| 4,963,902 A | 10/1990 | Fukahori | |
| 5,328,391 A * | 7/1994 | Soshi | G03B 17/14 439/543 |
| 5,713,048 A | 1/1998 | Hayakawa | |
| 5,734,935 A * | 3/1998 | Imanari | G03B 17/14 396/529 |
| 5,946,501 A | 8/1999 | Hayakawa | |
| 2015/0290997 A1 | 10/2015 | Imazu | |

FOREIGN PATENT DOCUMENTS

| | | |
|---|---|---|
| CN | 1155675 A | 7/1997 |
| CN | 1580849 A | 2/2005 |
| CN | 102621660 A | 8/2012 |
| CN | 204178095 U | 2/2015 |
| CN | 107959772 A | 4/2018 |
| JP | H07-128718 A | 5/1995 |
| JP | H07-319028 A | 12/1995 |
| JP | H08-106121 A | 4/1996 |

(Continued)

OTHER PUBLICATIONS

JP4636740 B2 Machine Translation, accessed Jun. 4, 2020 (Year: 2020).*

*Primary Examiner* — Minh Q Phan

(74) *Attorney, Agent, or Firm* — Canon U.S.A., Inc. IP Division

(57) ABSTRACT

An accessory mountable on and demountable from a camera body includes a first mount unit including a plurality of first bayonet claw portions, a second mount unit including a plurality of second bayonet claw portions configured to be engaged with the plurality of first bayonet claw portions, an elastic member configured to contact the camera body when the accessory is mounted on the camera body, and a holding member configured to hold the elastic member. The holding member is provided with a recessed portion which a part of the elastic member can enter when the accessory is mounted on the camera body.

14 Claims, 5 Drawing Sheets

(56) References Cited

FOREIGN PATENT DOCUMENTS

| | | |
|---|---|---|
| JP | H10-186486 A | 7/1998 |
| JP | 2864384 B2 | 3/1999 |
| JP | 11-174562 A | 7/1999 |
| JP | 2001042407 A | 2/2001 |
| JP | 2003-015010 A | 1/2003 |
| JP | 2009300928 A | 12/2009 |
| JP | 4636740 B2 * | 2/2011 |
| JP | 2013-080078 A | 5/2013 |
| JP | 2016-224219 A | 12/2016 |

* cited by examiner

ACCESSORY AND IMAGING APPARATUS INCLUDING THE SAME

BACKGROUND

Field of the Disclosure

The present disclosure relates to an accessory and an imaging apparatus including it.

Description of the Related Art

There is known a structure discussed in Japanese Patent Application Laid-Open No. 2003-15010 as a dust-proof and drip-proof structure for a mount portion in an imaging apparatus (e.g., a camera system) that allows a camera accessory (also referred to just as an accessory), such as an interchangeable lens and an adapter, to be mounted on and demounted from a camera body (camera main body) thereof. The structure discussed in Japanese Patent Application Laid-Open No. 2003-15010 is configured to include an elastic member on the camera accessory side and prevents dust and a water drop from entering the mount portion by squashing the elastic member when the camera accessory is mounted on the camera body.

The structure discussed in Japanese Patent Application Laid-Open No. 2003-15010 also includes an adjustment member for adjusting a back-focus in addition to the above-described dust-proof and drip-proof structure. This adjustment member can adjust the back-focus so as to correct the back-focus undesirably deviating from a designed value due to an attachment error or a manufacturing error of a lens in the camera accessory so that the back-focus becomes closer to the designed value. Further, Japanese Patent Application Laid-Open No. 2003-15010 also discusses adjusting the back-focus by cutting a plane of a component on the camera accessory side that is perpendicular to an optical axis, in addition to adjusting the back-focus using the above-described adjustment member.

Carrying out such a back-focus adjustment allows an appropriate positional relationship to be set between the dust-proof and drip-proof elastic member provided on the camera accessory and a surface on the camera body side which the elastic member is in contact with. However, when the back-focus is adjusted by cutting the plane of the component on the camera accessory side that is perpendicular to the optical axis, the back-focus may undesirably become shorter than an ideal value, for example, if the plane is inadvertently excessively cut. If the back-focus undesirably becomes shorter than the ideal value, the dust-proof and drip-proof elastic member may be excessively squashed when the camera accessory is mounted on the camera body, thereby making it difficult to demount the camera accessory from the camera body. Alternatively, this situation may make it difficult to perform an operation of mounting the camera accessory by rotating the camera accessory relative to the camera body, when mounting the camera accessory onto the camera body.

SUMMARY OF THE INVENTION

Therefore, various embodiments provide an accessory further easily mountable onto and demountable from the camera body and an imaging apparatus including it.

An accessory according to an aspect of some embodiments includes a first mount unit including a plurality of first bayonet claw portions, a second mount unit including a plurality of second bayonet claw portions configured to be engaged with the plurality of first bayonet claw portions, an elastic member configured to contact the camera body when the accessory is mounted on the camera body, and a cylindrical member holding the elastic member. The cylindrical member is provided with a recessed portion which a part of the elastic member can enter when the accessory is mounted on the camera body.

Further features of various embodiments will become apparent from the following description of exemplary embodiments with reference to the attached drawings.

DESCRIPTION OF THE EMBODIMENTS

In the following description, representative exemplary embodiments will be described in detail with reference to the accompanying drawings. FIGS. 1 to 5 illustrate an imaging apparatus according to these exemplary embodiments.

(Configuration of Imaging Apparatus)

Figure 1:
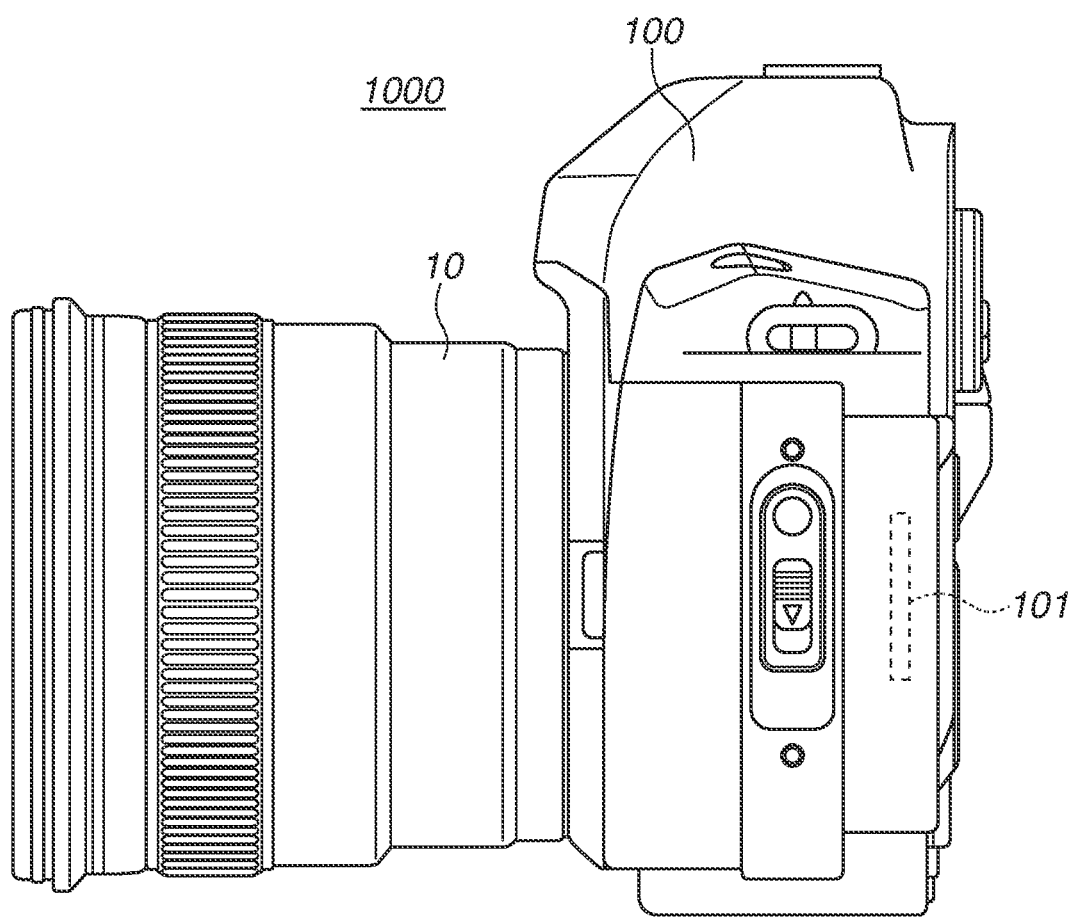
FIG. 1 is a side view of an imaging apparatus according to some exemplary embodiments.

FIG. 1 illustrates a configuration of an imaging apparatus (a camera system) 1000 according to the present first exemplary embodiment and a second exemplary embodiment, which will be described below. The imaging apparatus 1000 illustrated in FIG. 1 includes a camera body 100 and an interchangeable lens (a lens device or an accessory) 10. The camera body 100 and the interchangeable lens 10 each include a mount unit configured as a bayonet structure. More specifically, the camera body 100 includes a camera mount (a first mount unit) 1 including a plurality of camera-side bayonet claw portions (first bayonet claw portions) 1c illustrated in FIG. 3, which will be described below, and an image sensor 101. The image sensor 101 is provided inside the camera body 100 to receive light from the interchangeable lens 10.

(Configuration of Lens Device)

A configuration of the interchangeable lens 10 according to an exemplary embodiment will be described with reference to FIG. 2.

The interchangeable lens 10 includes a lens mount 11, an annular elastic member (an elastic member) 12, an external ring 13 as an interchangeable lens main body (lens body) or a cylindrical member (holding member), and a lens barrel 14 including at least one lens provided therein. The lens mount 11 includes a lens-side mount abutment surface 11a, a lens-side mount radial fitting portion 11b, a plurality of lens-side bayonet claw portions 11c, and an attachment surface 11d for coupling with the above-described camera mount 1. In other words, the lens mount (a second mount unit) 11 includes the plurality of lens-side bayonet claw portions (second bayonet claw portions) 11c configured to be engaged with the plurality of camera-side bayonet claw portions 1c. The attachment surface 11d is a surface of the lens mount 11 on a side of the external ring 13 (one side closer to the cylindrical member).

Positioning and fixing the lens mount 11 and the lens barrel 14 will be described. The lens mount 11 includes the lens barrel attachment surface 11d, which positions the lens barrel 14 in a thrust direction (an optical axis direction). The lens barrel 14 includes a lens mount abutment surface 14a, which positions the lens mount 11 in the thrust direction. The lens mount 11 and the lens barrel 14 can be positioned and fixed by fixing the lens mount 11 to the lens barrel 14 with use of a not-illustrated screw in a state where the lens barrel attachment surface 11d abuts on the lens mount abutment surface 14a.

The external ring 13 is provided with a not-illustrated offset protrusion, and is fixed while being placed on a side of the lens barrel 14 between the lens mount 11 and the lens barrel 14.

Attaching the annular elastic member 12 will be described. The annular elastic member 12 includes a close contact portion 12a, a holding portion 12b, a lens mount-side abutment surface 12c, and a camera mount-side abutment surface 12d. The annular elastic member 12 is sandwiched by an annular elastic member-side abutment surface 13a provided on the external ring 13 and the lens mount 11.

As a result, a position of the annular elastic member 12 in the optical axis direction is determined by the holding portion 12b, of the annular elastic member 12, as the holding portion 12b is sandwiched and compressed by the annular elastic member-side abutment surface 13a of the external ring 13 and the attachment surface 11d of the lens mount 11 in the optical axis direction. On the other hand, a position of the annular elastic member 12 in a radial direction is determined by sandwiching by an inner circumferential surface 13b of the external ring 13 and a side circumferential surface 11e of the lens mount 11. In some embodiments, the annular elastic member 12 is radially extended as a result of being sandwiched and compressed by the annular elastic member-side abutment surface 13a and the attachment surface 11d of the lens mount 11 in the optical axis direction. The annular elastic member 12 ends up being radially sandwiched by the inner circumferential surface 13b and the side circumferential surface 11e.

A plurality of lenses is provided inside the interchangeable lens 10. The plurality of lenses includes a focus lens unit, which moves in the optical axis direction at the time of focusing. A zoom lens unit, which moves in the optical axis direction at the time of zooming, may be further provided inside the interchangeable lens 10.

(Configuration of Camera body)

A configuration of the camera body 100, especially a configuration around the camera mount 1, will be described with reference to FIG. 3.

The camera body 100 includes the camera mount 1, a bayonet biasing spring 2, and a front cover 3. These components are fixed to a not-illustrated camera body structure.

The camera mount 1 includes a camera-side mount abutment surface 1a, a camera-side mount radial fitting portion 1b, and the plurality of camera-side bayonet claw portions 1c. When the interchangeable lens 10 is mounted on the camera body 100, the camera-side mount abutment surface 1a and the lens-side mount abutment surface 11a are brought into abutment with each other, and the camera-side mount radial fitting portion 1b and the lens-side mount radial fitting portion 11b are fitted to each other. Then, the camera-side bayonet claw portions 1c and the lens-side bayonet claw portions 11c are brought into abutment (engaged or fitted) with each other, and the lens-side bayonet claw portions 11c are biased toward one side on which the camera body 100 is located by the bayonet biasing spring 2.

(Method for Adjusting Back-Focus)

A back-focus adjustment is a process of correcting a deviation of infinity focus from a designed value that is caused due to a manufacturing error of a component of a lens and the barrel holding this lens, i.e., a deviation of a distance between a predetermined surface of the lens barrel and a focal plane from the designed value when an object at infinity is brought into focus.

A deviation amount of the back-focus from the designed value can be measured with use of, for example, a method discussed in the above-described patent literature, Japanese Patent Application Laid-Open No. 2003-15010, which uses a tool, such as a focusing collimator.

The back-focus is corrected so as to match a predetermined value (the designed value) by cutting or grinding the attachment surface 11d of the lens mount 11 by the same amount as the deviation amount of the back-focus measured using the above-described method. The back-focus is adjusted through this process.

Here, a thickness of the lens mount 11 (a thickness of the attachment surface 11d before it is cut) is desirably set in the following manner. That is, a maximum value of the deviation amount of the back-focus that is generated due to the manufacturing error of each lens and barrel is acquired from a calculation. Then, the thickness of the lens mount 11 is desirably set to such a value that the thickness of the lens mount 11 would remain sufficiently as an actual product even if the lens mount 11 is cut or ground by an amount corresponding to this maximum value. As a result, the lens mount 11 is always attached to the lens barrel 14 after the cutting or grinding regardless of the deviation amount of the back-focus.

In the present exemplary embodiment, the back-focus adjustment has been described referring to the method that cuts or grinds the attachment surface 11d of the lens mount 11, but it may be the lens mount abutment surface 14a of the lens barrel 14 that is cut or ground. Also, both the attachment surface 11d and the lens mount abutment surface 14a may be cut or ground. Additionally, the back-focus may be adjusted by providing, and cutting or grinding, a ring-like member for adjusting the back-focus on at least one of the attachment surface 11d and the lens mount abutment surface 14a. Further, when the attachment surface 11d or the lens mount abutment surface 14a is inadvertently excessively cut or ground, the back-focus may be adjusted by adding a washer between the attachment surface 11d and the lens mount abutment surface 14a.

The interchangeable lens 10 according to the present exemplary embodiment may be a zoom lens including a zoom lens unit or may be a fixed focal length lens. Regardless of whether the interchangeable lens 10 is the zoom lens or the fixed focal length lens, the back-focus can be adjusted with use of the above-described method.

(Annular Space Portion)

An annular space portion (a space portion, a recessed portion, or an annular recessed portion) 15 is formed between the external ring 13 and the annular elastic member 12. The annular space portion 15 is located on the same plane as the lens mount-side abutment surface 12c of the annular elastic member 12, and is formed on the external ring 13 as an annular recessed portion. In other words, the external ring 13 is provided with the annular space portion 15.

The annular space portion 15 is formed in such a manner that an outer diameter thereof matches a fitting diameter between the annular elastic member 12 and the external ring 13. The annular space portion 15 is formed in such a manner that an inner diameter thereof matches an outer diameter of the lens mount 11. The annular space portion 15 is formed in such a manner that a dimension thereof in the thrust direction exceeds the maximum value of the deviation amount of the above-described back-focus.

(Annular Elastic Unit)

The annular elastic member 12 will be described with reference to FIG. 3.

When the interchangeable lens 10 and the camera 100 are coupled with each other (the interchangeable lens 10 is mounted on the camera body 100), the close contact portion 12a of the annular elastic member 12 is brought into close contact with the front cover 3, being elastically deformed along a line of the front cover 3. FIG. 3 illustrates a shape of the annular elastic member 12 before the elastic deformation (with the interchangeable lens 10 demounted from the camera body 100) is caused with a chain line. And FIG. 3 illustrates a shape of the annular elastic member 12 after the elastic deformation is caused (with the interchangeable lens 10 mounted on the camera body 100) with a solid line.

A relative positional relationship between the annular elastic member 12 and the front cover 3 may be set to maintain a water-tightly coupled relationship between the camera mount 1 and the lens mount 11 when the deviation amount of the back-focus in the above-described back-focus adjustment is zero. Also, the relative positional relationship between them may be set in such a manner that the close contact portion 12a of the annular elastic member 12 is in contact (close contact) with the front cover 3 in a deformed state when the deviation amount of the back-focus in the above-described back-focus adjustment is zero.

As described above, the lens mount 11 is cut or ground with the same thickness as the deviation amount of the back-focus in the back-focus adjustment. As a result, the lens mount 11 is thinned, and an interval between the annular elastic member 12 and the front cover 3 is reduced by the deviation amount of the back-focus, i.e., the amount by which the lens mount 11 is cut (ground). This means that the camera body 100 is displaced closer to the interchangeable lens 10 as a result of the back-focus adjustment. The cutting or grinding the lens mount 11 may cause the front cover 3 to further press the annular elastic member 12 by a cutting or grinding amount, thereby leading to an increase in friction generated between the close contact portion 12a and the front cover 3.

In other words, if an elastic deformation force is greater when the annular elastic member 12 is elastically deformed along the line of the front cover 3, a stronger frictional force may be generated between the annular elastic member 12 and the front cover 3, and a user may feel more resistance when the interchangeable lens 10 is mounted/demounted onto/from the camera body 100.

(Advantageous Effects Acquired by Present Exemplary Embodiment)

The interchangeable lens 10 according to the present exemplary embodiment includes the annular space portion 15 as a countermeasure against the above-described increase in the friction. The annular elastic member 12 pressed by the amount as large as the deviation amount of the back-focus is configured to escape into the annular space portion 15 along with the elastic deformation, thereby preventing or cutting down the above-described increase in the friction.

In other words, the external ring 13 is provided with the annular space portion 15. A part of the annular elastic member 12 can enter the annular space portion 15 when the interchangeable lens 10 (as an accessory) is mounted on the camera body 100. Therefore, the present exemplary embodiment can prevent or reduce the above-described increase in the friction and realize an accessory which is further easily mountable onto and demountable from the camera body 100. In other words, the present exemplary embodiment can allow the annular elastic member 12 to escape into the annular space portion 15 to prevent or reduce the above-described increase in the friction, so that the interchangeable lens 10 can be comfortably mounted onto the camera body 100 or comfortably demounted from the camera body 100.

The dimension of the annular space portion 15 in the thrust direction is larger than the maximum value of the above-described deviation amount of the back-focus, so that a gap would be generated between the annular elastic member 12 and the annular space portion 15 even if the back-focus is adjusted by an amount corresponding to an maximum value. In other words, even if the back-focus is adjusted by the amount corresponding to the maximum value, the annular elastic member 12 can be deformed within the annular space portion 15. Therefore, the water-tight relationship between the camera mount 1 and the lens mount 11 can be maintained regardless of the deviation amount of the back-focus.

If the back-focus is adjusted by an excessive amount (e.g., the attachment surface 11d of the lens mount 11 or the lens mount abutment surface 14a of the lens barrel 14 is inadvertently excessively cut), one possible method to handle this case is as follows. In this case, the back-focus may be adjusted with use of an adjustment member, such as a washer, while the interchangeable lens 10 is configured to allow a part of the annular elastic member 12 to enter the annular space portion 15 when the interchangeable lens 10 is mounted on the camera body 100. However, it is more desirable that providing such an adjustment member is avoided because a weight of the interchangeable lens 10 becomes lighter or manufacturing cost can be reduced if such an adjusting member is not used.

In the present exemplary embodiment, the advantageous effect has been described referring to the example in which the stronger frictional force is generated between the annular elastic member 12 and the cover 3 due to the back-focus adjustment, but the advantageous effect of the present exemplary embodiment is not limited to the effect for the interchangeable lens 10 that is configured to perform the back-focus adjustment. For example, the present exemplary embodiment also has the advantageous effect when a material of the front cover 3 of the camera 100 includes a material that generates a stronger frictional force with the annular elastic member 12. More specifically, the present exemplary embodiment is especially effective when the front cover 3 is made from metal, such as aluminum (e.g., when the front cover 3 is a metallic member), compared to when the annular elastic member 12 is made from silicon rubber and the front cover 3 is made from resin, such as polycarbonate (PC).

The annular space portion 15 does not have to be a closed space completely sandwiched between the external ring 13 and the annular elastic member 12. For example, as illustrated in FIG. 2, a penetration portion 15a, which penetrates through the external ring 13 so as to connect a bottom surface of the annular space portion 15 and the inside or the outside of the interchangeable lens 10, may be provided on the external ring 13 as an air escape when the annular elastic member 12 is installed.

Further, the annular space portion 15 may be formed in such a manner that the inner diameter thereof matches the outer diameter of the lens mount 11, but the inner diameter of the annular space portion 15 may be larger than the outer diameter of the lens mount 11. In other words, the intended result can be achieved as long as the inner diameter of the annular space portion 15 is equal to or larger than the outer diameter of the lens mount 11.

Further, the annular space portion 15 may be formed in such a manner that the outer diameter thereof matches the fitting diameter between the annular elastic member 12 and the external ring 13, but the outer diameter of the annular space portion 15 may be smaller than the fitting diameter between the annular elastic member 12 and the external ring 13. In other words, the intended result can be achieved as long as the outer diameter of the annular space portion 15 is equal to or smaller than the fitting diameter between the annular elastic member 12 and the external ring 13.

In a case where the outer diameter of the annular space portion 15 is smaller than an outer diameter of the annular elastic member 12, the annular elastic member 12 is press-fitted into the annular space portion 15, so that the annular elastic member 12 can be stably held.

An accessory (e.g., lens device) according to a second exemplary embodiment will be described with reference to FIGS. 4 and 5. A difference between the above-described first exemplary embodiment and the present exemplary embodiment is the shape (or the size) of the annular space portion provided on the external ring and the shape of the annular elastic member. Other than that, similar components will be identified by the same reference numerals, and descriptions thereof will be omitted below.

Figure 2:
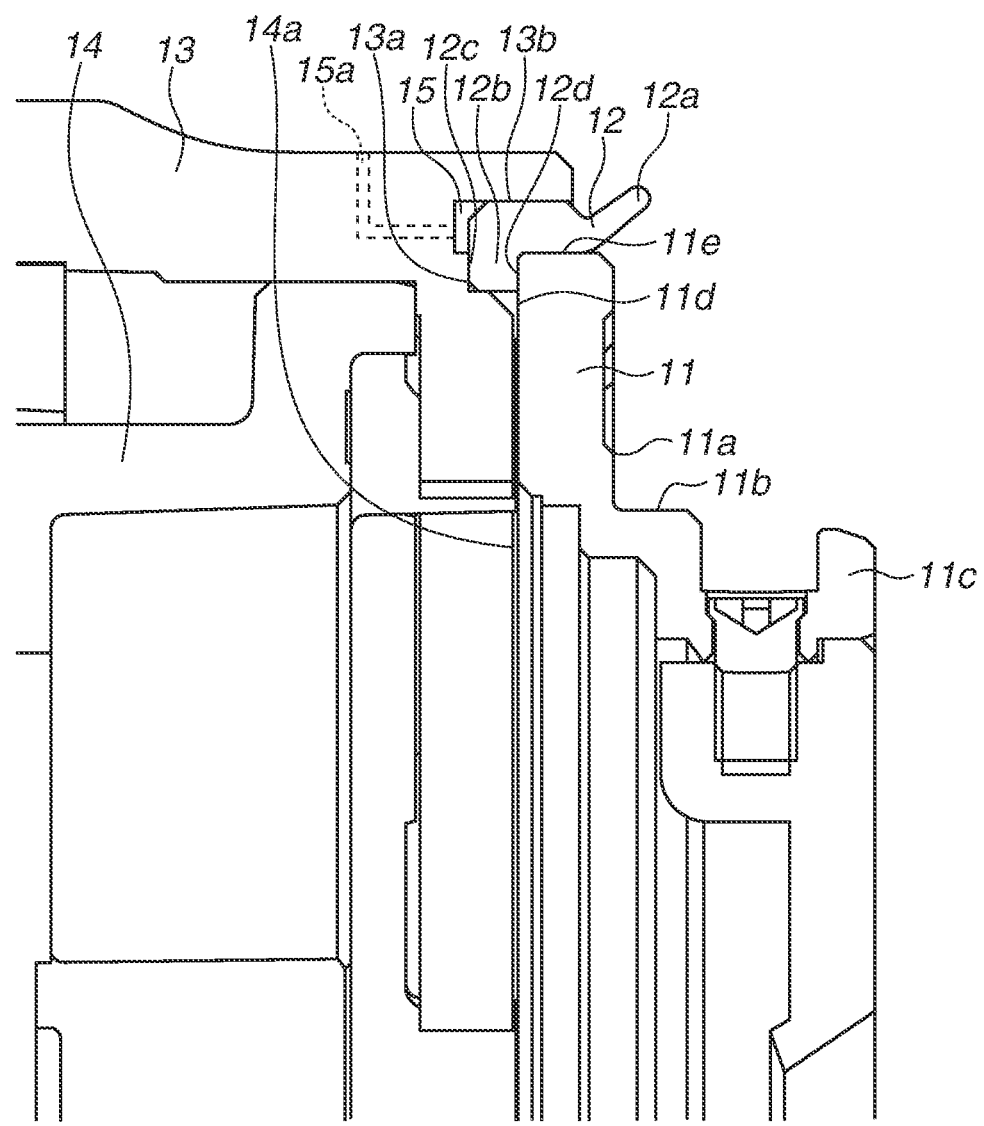
FIG. 2 is a partial cross-sectional view of an interchangeable lens according to a first exemplary embodiment.
Figure 3:
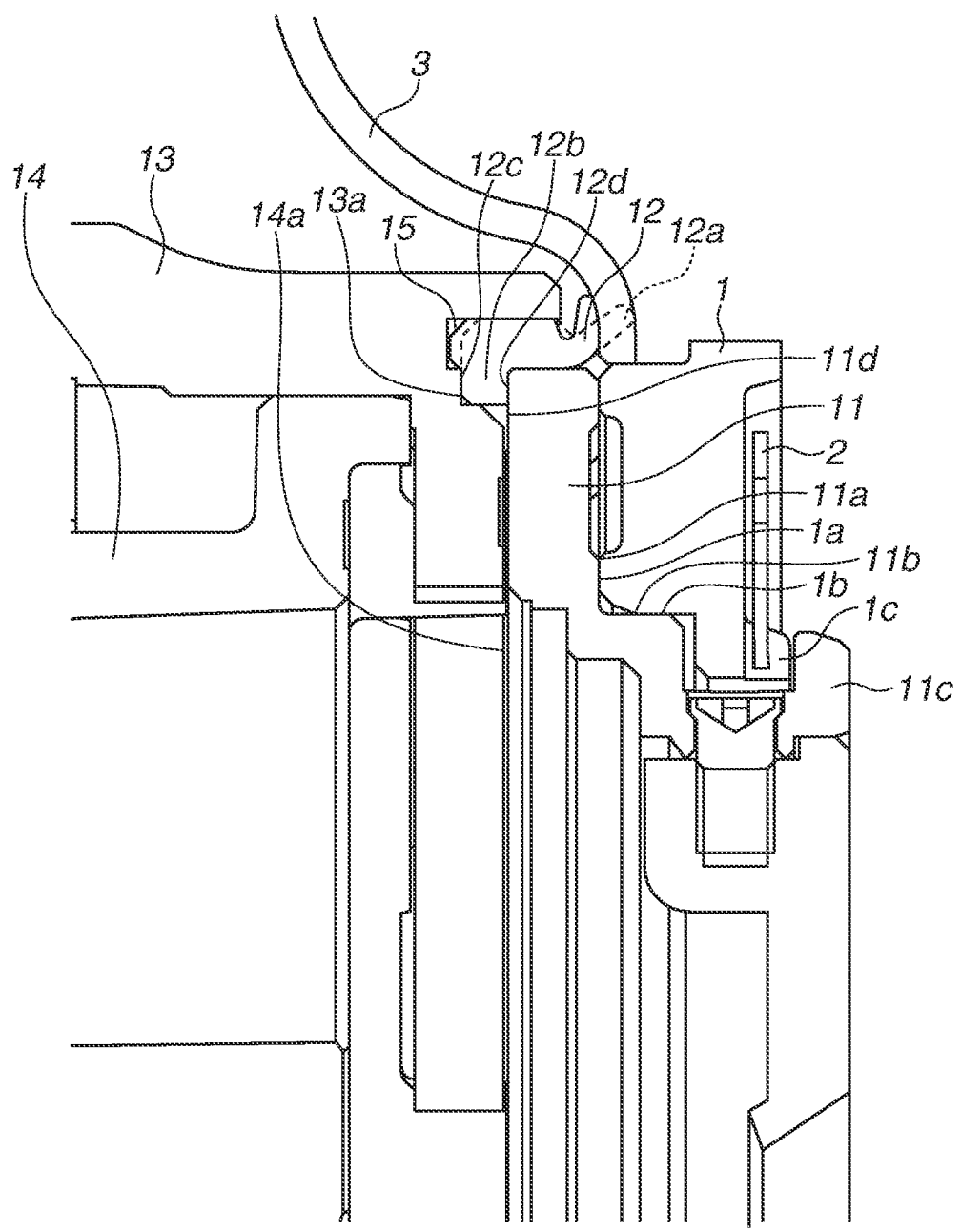
FIG. 3 is a partial cross-sectional view of the interchangeable lens and a camera body according to the first exemplary embodiment.

In the above-described first exemplary embodiment, as illustrated in FIGS. 2 and 3, a width of the annular space portion 15 provided on the external ring 13 in a direction perpendicular to the optical axis (a width extending in a vertical direction relative to the paper of the drawings) is narrower than a width of the annular elastic member 12 in the direction perpendicular to the optical axis. Then, as illustrated in FIG. 2, the annular elastic member 12 is separated from the bottom surface of the annular space portion 15 when the interchangeable lens 10 is demounted from the camera body 100. As illustrated in FIG. 3, the annular elastic member 12 is brought into contact with the bottom surface of the annular space portion 15 when the interchangeable lens 10 is mounted on the camera body 100.

While the first exemplary embodiment is configured in this manner, an interchangeable lens 20, which is the accessory according to the present exemplary embodiment, includes an external ring 23 instead of the external ring 13, an annular elastic member 22 instead of the annular elastic member 12, and an annular space portion 25 instead of the annular space portion 15. The interchangeable lens 20 includes the lens mount 11 similar to the interchangeable lens 10, and therefore is mountable on and demountable from the camera body 100.

Figure 4:
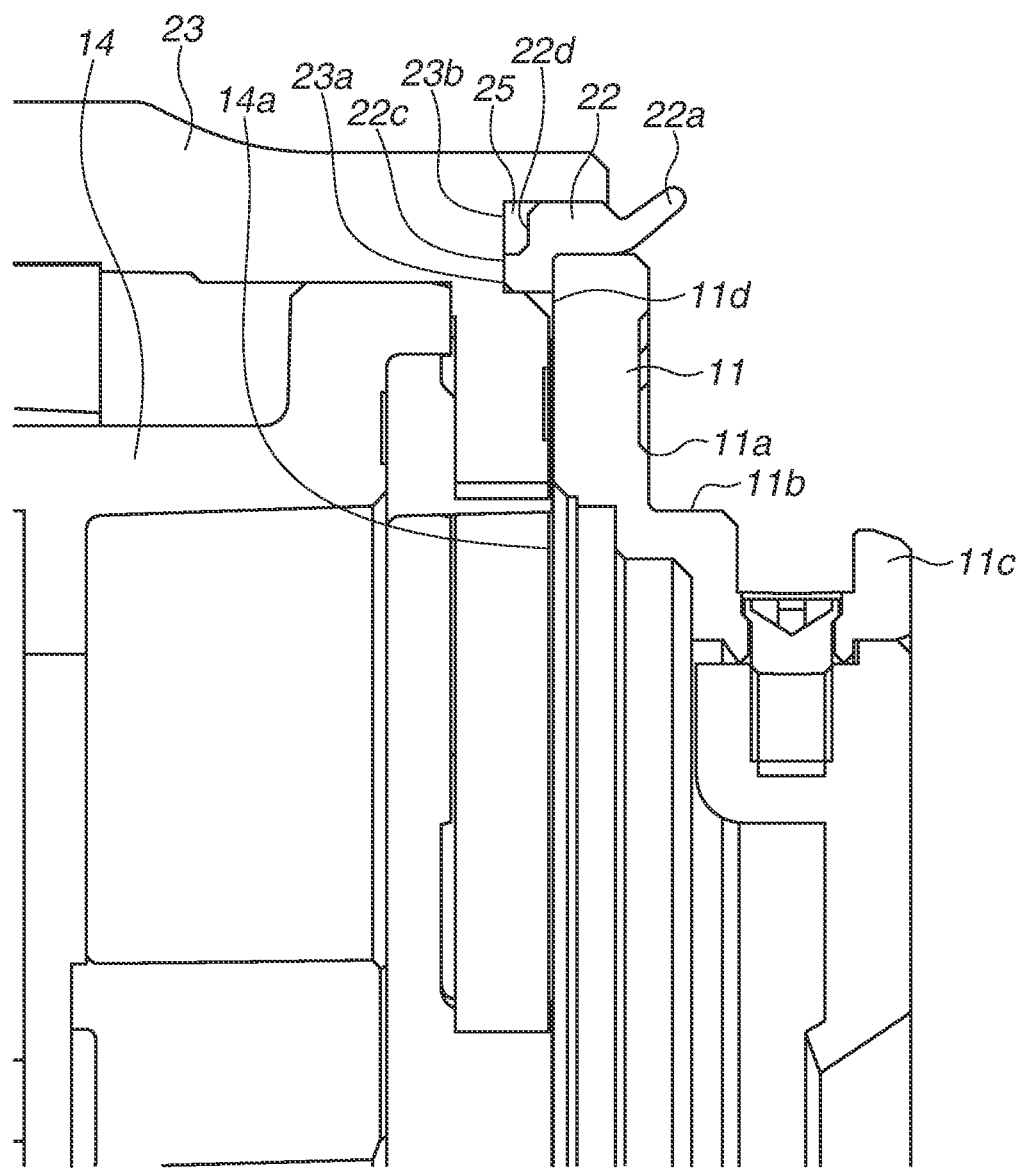
FIG. 4 is a partial cross-sectional view of an interchangeable lens according to a second exemplary embodiment.
Figure 5:
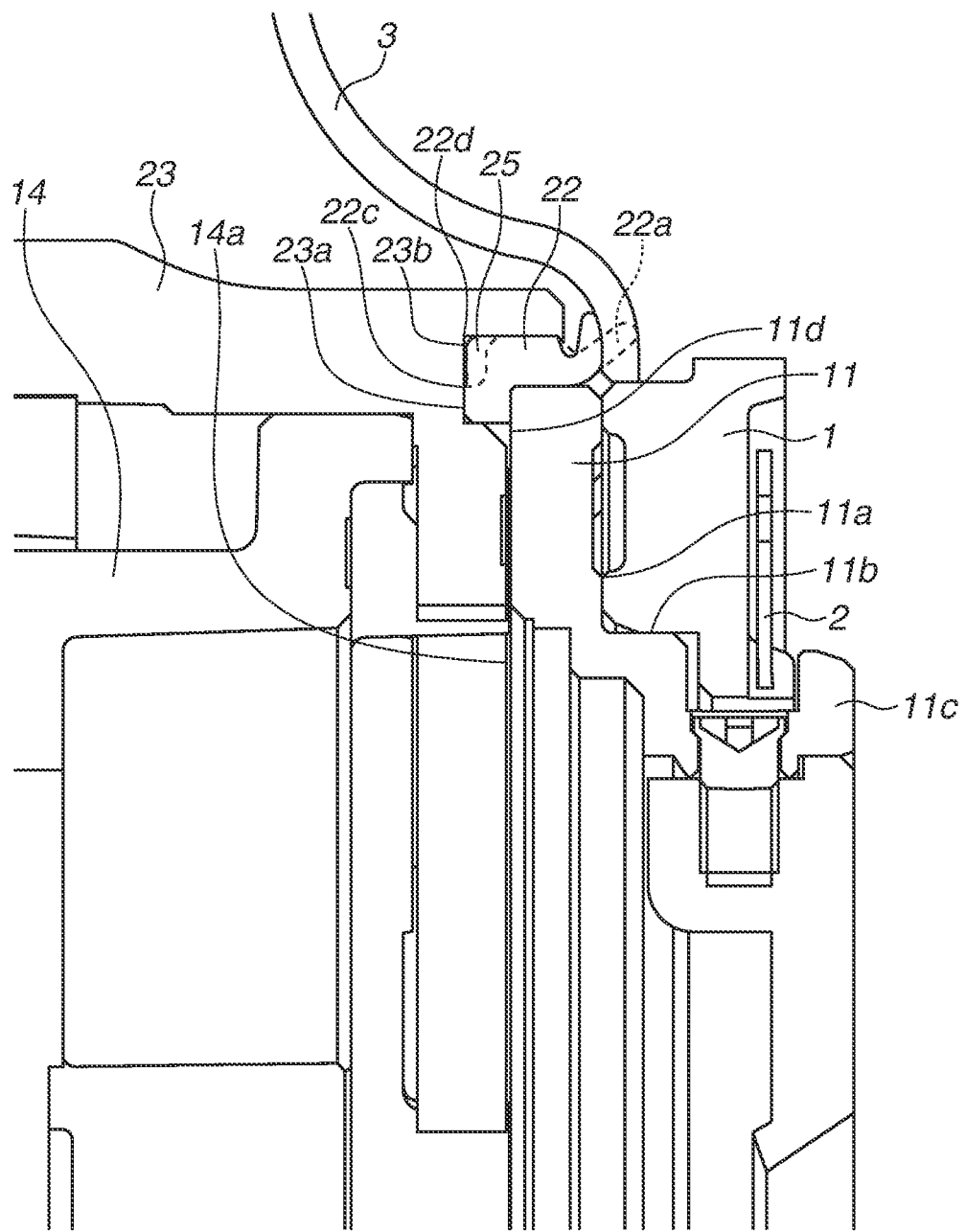
FIG. 5 is a partial cross-sectional view of the interchangeable lens and a camera body according to the second exemplary embodiment.

As illustrated in FIGS. 4 and 5, a width of the annular space portion 25 in the direction perpendicular to the optical axis is equal to a width of the annular elastic member 22 in the direction perpendicular to the optical axis. As illustrated in FIG. 4, when the interchangeable lens 20 is demounted from the camera body 100, a first lens mount-side abutment surface 22c (a first portion) of the annular elastic member 22 is in contact with a bottom surface of the annular space portion 25. More specifically, when the interchangeable lens 20 is demounted from the camera body 100, the abutment surface 22c of the annular elastic member 22 is in contact with an elastic member abutment surface 23a of the external ring 23, which is a part of the bottom surface of the annular space portion 25.

As illustrated in FIG. 5, when the interchangeable lens 20 is mounted on the camera body 100, a second lens mount-side abutment surface 22d (a second portion) of the annular elastic member 22 is also in contact with the bottom surface of the annular space portion 25 in addition to the abutment surface (the first portion) 22c of the annular elastic member 22. More specifically, when the interchangeable lens 20 is mounted on the camera body 100, the abutment surface 22c is in abutment with the abutment surface 23a. The abutment surface 22d of the annular elastic member 22 is in contact with an elastic member abutment surface 23b of the external ring 23, which is a part of the bottom surface of the annular space portion 25.

The abutment surface 22c does not necessarily have to be in contact with the abutment surface 23a when the interchangeable lens 20 is demounted form the camera body 100. Further, the abutment surface 22d does not necessarily have to be in contact with the abutment surface 23b when the interchangeable lens 20 is mounted on the camera body 100. For example, the intended result can be achieved if a distance between the abutment surface 22d and the abutment surface 23b in the optical axis direction is longer than a distance between the abutment surface 22c and the abutment surface 23a when the interchangeable lens 20 is demounted from the camera body 100. Also, the intended result can be achieved if the annular space portion 25 includes therein a space into which a deformed portion of the annular elastic member 22 escapes when the interchangeable lens 20 is mounted onto the camera body 100.

The present exemplary embodiment configured in this manner can also realize an accessory which is further easily mountable onto and demountable from the camera body similarly to the above-described first exemplary embodiment.

[Exemplary Modifications]

The interchangeable lens has been described as the accessory in the above-described first and second exemplary embodiments by way of example, but the some embodiments are not limited to an interchangeable lens. The configurations according to the above-described first and second exemplary embodiments may be applied to an adapter mountable on and demountable from the camera body 100, the adapter including an annular space portion, an annular elastic member, and a mount unit structured similarly to the lens mount 11, and attachable between the interchangeable lens and the camera body 100. The adapter described here means an extender, a mount conversion adapter, and the like.

Further, a non-annular elastic member may be used instead of the annular elastic member. For example, a plurality of elastic members arranged on the same circumference while being spaced at predetermined intervals may be used instead of one elastic member that is annular (i.e., continuously formed 360 degrees). Along with the plurality of elastic members, a plurality of space portions arranged on the same circumference while being spaced at predetermined intervals may be used instead of the annular space portion.

Further, the configuration including the space portion in the external ring 13 as the interchangeable lens main body or the cylindrical member has been described in the above-described first and second exemplary embodiments by way of example, but some embodiments are not be limited to such a configuration. The space portion may be provided on a member other than the external ring 13, such as the lens barrel 14, as long as the member is a cylindrical member (e.g., a member shaped like a cylinder or an annular member).

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-151367, which was filed Aug. 10, 2018 and which is hereby incorporated by reference herein in its entirety.

What is claimed is:

1. An accessory detachably mountable to a camera body including a first mount unit including a plurality of first bayonet claw portions, the accessory comprising:
    a second mount unit including a plurality of second bayonet claw portions configured to be engaged with the plurality of first bayonet claw portions when the accessory is mounted on the camera body;
    an elastic member configured to contact the camera body when the accessory is mounted on the camera body; and
    a holding member configured to hold the elastic member, wherein the holding member is provided with a recessed portion which a part of the elastic member can enter when the accessory is mounted on the camera body, and
    wherein the elastic member is separated from a bottom surface of the recessed portion when the accessory is demounted from the camera body.

2. The accessory according to claim 1, wherein the recessed portion is an annular recessed portion, and an inner diameter of the annular recessed portion is larger than an outer diameter of the second mount unit.

3. The accessory according to claim 1, wherein the recessed portion is an annular recessed portion, and an outer diameter of the annular recessed portion is smaller than an outer diameter of the elastic member.

4. The accessory according to claim 1, wherein the recessed portion is an annular recessed portion, and an inner diameter of the annular recessed portion is equal to an outer diameter of the second mount unit.

5. The accessory according to claim 1, wherein the recessed portion is an annular recessed portion, and an outer diameter of the annular recessed portion is equal to an outer diameter of the elastic member.

6. The accessory according to claim 1, wherein a surface of the second mount unit on a side closer to the holding member is cut or ground.

7. The accessory according to claim 1, wherein the elastic member is in contact with a bottom surface of the recessed portion when the accessory is mounted on the camera body.

8. The accessory according to claim 1, wherein the elastic member is in contact with a metallic member provided on the camera body when the accessory is mounted on the camera body.

9. The accessory according to claim 1, wherein the recessed portion includes a penetration portion penetrating to reach an inside or an outside of the holding member.

10. The accessory according to claim 1, wherein the accessory is a lens device including a plurality of lenses.

11. The accessory according to claim 1, wherein the accessory is an adapter mountable between a lens device including a plurality of lenses and the camera body.

12. The accessory according to claim 1, further comprising:
    a plurality of lenses.

13. The accessory according to claim 1, further comprising:
    a mount unit mountable to a lens device.

14. An accessory detachably mountable to a camera body including a first mount unit including a plurality of first bayonet claw portions, the accessory comprising:
    a second mount unit including a plurality of second bayonet claw portions configured to be engaged with the plurality of first bayonet claw portions when the accessory is mounted on the camera body;
    an elastic member configured to contact the camera body when the accessory is mounted on the camera body; and
    a holding member configured to hold the elastic member, wherein the holding member is provided with a recessed portion which a part of the elastic member can enter when the accessory is mounted on the camera body,
    wherein a first portion of the elastic member is in contact with a bottom surface of the recessed portion when the accessory is demounted from the camera body,
    wherein a second portion of the elastic member is separated from the bottom surface of the recessed portion when the accessory is demounted from the camera body, and
    wherein the first portion and the second portion are in contact with the bottom surface of the recessed portion when the accessory is mounted on the camera body.

* * * * *